United States Patent
Abielmona et al.

(10) Patent No.: US 10,575,188 B1
(45) Date of Patent: Feb. 25, 2020

(54) OVERHEAD WIRELESS ACCESS POINT DEPLOYMENTS FOR ARENAS, STADIUMS AND OTHER VENUES

(71) Applicant: Everest Networks, Inc., Mountain View, CA (US)

(72) Inventors: Samer Abielmona, Montréal Quebec (CA); Van Hoang Nguyen, Senneville (CA); Jean-François Frigon, Brossard (CA)

(73) Assignee: Everest Networks, Inc., Mountain View, CA (US)

( * ) Notice: Subject to any disclaimer, the term of this patent is extended or adjusted under 35 U.S.C. 154(b) by 0 days.

(21) Appl. No.: 16/252,384

(22) Filed: Jan. 18, 2019

Related U.S. Application Data

(60) Provisional application No. 62/619,375, filed on Jan. 19, 2018.

(51) Int. Cl.
*H04W 16/20* (2009.01)
*H04W 16/26* (2009.01)
*H04W 16/28* (2009.01)
*H04B 7/0452* (2017.01)

(52) U.S. Cl.
CPC .......... *H04W 16/20* (2013.01); *H04B 7/0452* (2013.01); *H04W 16/26* (2013.01); *H04W 16/28* (2013.01)

(58) Field of Classification Search
CPC ............. H04W 52/241; H04W 52/247; H04W 52/248; H04W 52/346; H04W 52/42
See application file for complete search history.

(56) References Cited

U.S. PATENT DOCUMENTS

| | | | |
|---|---|---|---|
| 2007/0047678 A1* | 3/2007 | Sibecas | H04B 1/7115 375/343 |
| 2014/0169430 A1* | 6/2014 | Nilsson | H04B 7/043 375/227 |
| 2017/0086184 A1 | 3/2017 | Pabla | |
| 2018/0233799 A1* | 8/2018 | Sanford | H01Q 1/06 |
| 2019/0044250 A1* | 2/2019 | Pan | H01Q 1/20 |

* cited by examiner

*Primary Examiner* — Diane D Mizrahi
(74) *Attorney, Agent, or Firm* — Fish & Richardson P.C.

(57) ABSTRACT

A wireless network includes a plurality of access points installed in a venue. The access points integrate multiple radios coupled with directional antennas with reconfigurable coverage. The directional antennas are configured to transmit and receive orthogonally polarized signals that support transmission of at least two data streams to or from mobile devices of users who are present in the venue. Additionally, wireless network includes at least one backhaul or backbone network coupled to the plurality of access points.

20 Claims, 5 Drawing Sheets

OVERHEAD WIRELESS ACCESS POINT DEPLOYMENTS FOR ARENAS, STADIUMS AND OTHER VENUES

CROSS-REFERENCE TO RELATED APPLICATIONS

This application claims benefit under 35 U.S.C. § 119(e)(1) of U.S. Provisional Application No. 62/619,375, filed on Jan. 19, 2018, which is incorporated by reference herein.

TECHNICAL FIELD

This disclosure is directed to deployment of wireless network technology.

BACKGROUND

In the last decade, ultra-high density (UHD) WiFi deployments in stadiums and arenas have seen an evolution from a network-based architecture employing overhead access points (APs) to deployments predominantly based on APs installed under the seats and in handrails. Such deployments, however, are not the optimum solution for stadium and arena WiFi deployment.

Early UHD WiFi networks in stadiums and arenas focused on using APs employing first generation overhead directional antennas to provide radio frequency (RF) coverage with controlled co-channel interference, as illustrated in FIG. 1. These first generation APs that were generally deployed in the back or above seating sections, did not provide RF coverage in the entire venue, particularly in the front rows of long sections.

A solution to this coverage problem was to employ fill-in (or in-crowd) APs installed in the front of long sections, in handrails and under the seats. The design objective of those fill-in APs was to improve and make uniform RF coverage to provide greater throughput to users. With the introduction of new fan engagement and social media applications, WiFi networks with fill-in APs got overloaded as the network capacity could not accommodate the growing user demand. One of the problems was that only few clients would connect to the fill-in APs and most would associate to the overhead APs, which was not able to service up to a thousand client devices. The reality of fill-in APs was therefore vastly different from its intended goals.

Since solutions involving overhead APs were seemingly underperforming, a new approach has emerged over the last five years where overhead APs are being removed and replaced with fill-in APs by blanketing the venue with many hundreds of under-seat and handrail APs within the crowd, as shown in FIG. 2. The intended advantages of this deployment approach are three-fold. First is to create smaller cells (typically around 75 seats) to increase the network capacity. Second is to provide uniform RF coverage because of the AP's proximity to users. Third is to enhance the channel reuse factor by taking advantage of the crowd body attenuation reducing the RF signal propagation. The use of fill-in APs, however, was a solution to the original problem of underperforming and suboptimal first generation APs, which failed to deliver in large venues. Accordingly, generalizing the fill-in AP solution to an entire venue is not the optimum solution to the coverage problem.

SUMMARY

Embodiments of systems, methods and apparatus are disclosed for a WiFi network solution that employs next generation overhead APs integrating multiple WiFi radios coupled with directional antennas with re-configurable coverage. These embodiments can meet all service requirements for a large public venue (e.g., arenas and stadiums) at a lower cost and better performance than WiFi network solutions employing handrails and under-seat APs.

Note that, in this disclosure, the qualifier "next generation" as applied to APs refers to implementations of APs similar but not limited to any one of the universally flexible access points 401, 701, 1001, 1101, 1201, 1401, or 1501 described in U.S. Pat. No. 10,129,887, or to any one of the multi-radio multi-port array (MR-MPA) antenna systems 3100M, or 3200M described in PCT application publication WO 2018/226764. The entire contents of each of U.S. Pat. No. 10,129,887 and PCT application publication WO 2018/226764 are incorporated by reference herein.

In general, innovative aspects of the technologies described herein can be implemented in wireless networks that include one or more of the following aspects:

In one aspect, a wireless network includes a plurality of access points installed in a venue. The access points integrate multiple radios coupled with directional antennas with reconfigurable coverage. The directional antennas are configured to transmit and receive orthogonally polarized signals that support transmission of at least two data streams to or from mobile devices of users who are present in the venue. Additionally, wireless network includes at least one backhaul or backbone network coupled to the plurality of access points.

The foregoing and other embodiments can each optionally include one or more of the following features, alone or in combination. In some implementations, the access points can be installed above the users. Here, a line of sight between an access point and a given user is unimpeded by permanent venue structures which are closer to the access point than the given user.

In some implementations, one or more directional antennas of at least one of the access points is configured to provide service to at least one of the mobile devices at a distance of at least 100 feet from the access point. In some implementations, each directional antenna can provide at least 13 dBi of antenna gain to at least one of the mobile devices at a distance of at least 100 feet from the access point. In some implementations, the directional antennas are configured such that the antenna gain of all directional antennas varies less than 3 dB across the entire operating band of the multiple radios.

In some implementations, the directional antennas and the multiple radios of each access point can be integrated inside a respective single chassis. In some implementations, the access points are configured to enable multiple-input and multiple-output (MIMO) or multi-user (MU)-MIMO transmissions from a radio from among the multiple radios of an access point by using the orthogonally polarized signals. In some implementations, a directional antenna of an access point is configured to transmit multiple beams at different angles to enable MIMO or MU-MIMO transmissions from a radio from among the multiple radios of the access point.

In some implementations, a directional antenna of an access point is configured to transmit a beam with a width of 30 degrees or less. In some implementations, a directional antenna of an access point is configured so that the difference between the maximum antenna gain and the maximum gain outside the main antenna beam is at least 15 dB.

In some implementations, the directional antennas in an access point are reconfigurable to provide a coverage zone where users connect to a given radio of the multiple radios of the access point in a different direction for each radio. In some cases, coverage zones for different radios in an access point are configured to be partially overlapping. In some cases, coverage zones for different radios in different access points are configured to be partially overlapping. In some cases, different radios in an access point are configured to transmit RF signals with different power. For instance, a first radio, which provides coverage to a first zone with a shorter distance from the access point than a second zone to which coverage is provided from a second radio in the same access point, is configured to transmit with less power than the second radio.

In some implementations, an access point is configured to balance load between multiple radios in the access point or in other access points. In some cases, the backhaul network can enable users to receive the same wireless service from different access points.

In some implementations, a radio of the multiple radios of an access point is configured to provide a coverage zone where between 100 and 175 users connect to the radio. In some implementations, a directional antenna is reconfigured to provide coverage to at least three zones where users connect to a radio, the coverage to each zone being provided with a different angle. In some cases, the directional antennas in the access point are reconfigured to provide coverage to a single zone with the same angle for two different radios. For instance, the access points are configured so different coverage zone configurations are applied to two different access points.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
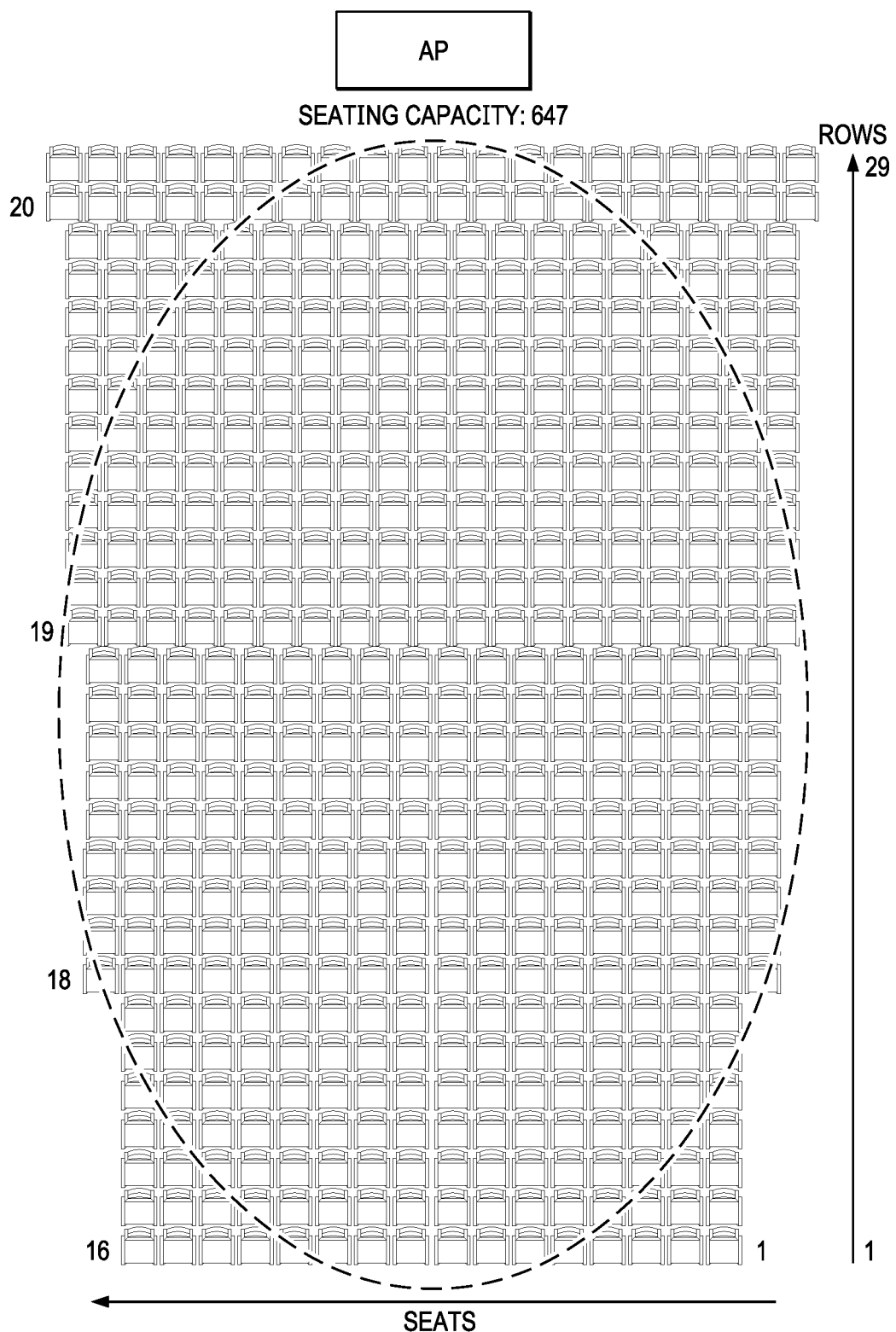
FIG. 1 illustrates the use of overhead directional antennas to provide radio frequency (RF) coverage with controlled co-channel interference.

New advances in antenna and AP technology enable the deployment of WiFi networks in large venues (e.g., which accommodate audiences of hundreds or thousands of people) using overhead APs that provide a better end-user experience and lower installation costs than solutions based on deploying APs under-seats and handrails.

The requirements that are to be addressed for wireless coverage in large venues include: 1) quality coverage throughout the entire venue; and 2) a large number of WiFi enabled devices. The first requirement, to provide a quality coverage to the entire venue, entails providing a minimum signal to interference plus noise ratio (SINR) for both downlink and uplink traffic in all expected operating scenarios for the venue, which can range from an empty to a full venue. Typically, the target minimum SINR level is around 10 to 15 dB. To maximize the SINR we must pay attention to both the signal level and the interference level. In stadiums, arenas and similar venues, the interference mostly emanates from APs and client devices transmitting on the same or adjacent channels. Quality coverage also entails providing RF signals efficiently enabling Multiple Input Multiple Output (MIMO) transmissions with two streams (most client devices used in UHD venues now support MIMO transmission with two streams) and also multi-user (MU) MIMO transmissions to increase the number of simultaneously transmitted streams and thus the user achievable throughput. The combination of good SINR and MIMO/MU-MIMO support enables each WiFi radio to use each available channel the most effectively. Also, to provide the largest possible WiFi network capacity, the solution needs to use the most channels that are permitted by regulation.

The second requirement necessitates a network designed to provide sufficient capacity to accommodate for the large number of devices that want to connect and use the WiFi network. A properly designed AP for a UHD environment can accommodate 100 to 150 active clients per WiFi radio. Active clients run a mixture of applications generating background data and applications with real-time and interactive data requirements. These applications tend to have varying duty cycles and generate intermittent, bursty-like traffic. Therefore, a typical stadium with 70,000 seats would require about 500 to 700 WiFi radios, and for a 18,000 seats arena approximately 150 to 200 WiFi radios, to provide adequate client capacity.

To summarize these two requirements, a solution is desired that enables the deployment of a large number of WiFi radios to cover the entire venue with a minimum target SINR and efficient support for MIMO and MU-MIMO transmissions.

Furthermore, capacity requirements are not stationary and not uniform throughout the entire venue. They also vary for different types of events within the same venue, i.e., concerts vs. sporting events. It is therefore important to have sufficient overlap between the coverage of radios to enable client load balancing to avoid overloading the capacity of a specific radio. This requirement will become even more important as WiFi networks are increasingly called upon to support cellular data offload. Finally, the economics of deploying WiFi networks along with building architectural and aesthetics constraints should be considered for any solution.

Figure 3:
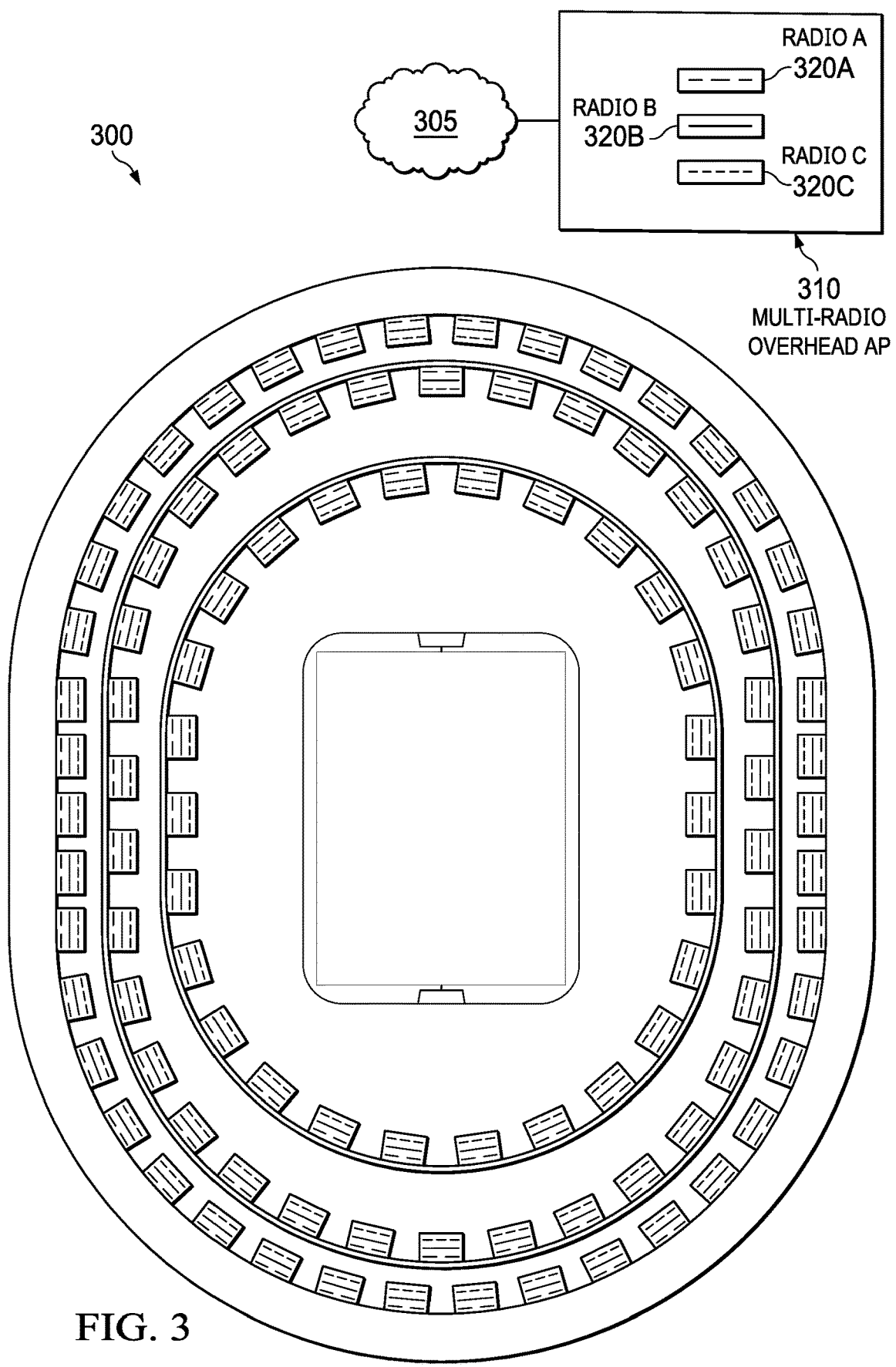
FIG. 3 illustrates a WiFi network solution employing next generation overhead APs integrating multiple WiFi radios coupled with directional antennas with re-configurable coverage, according to an embodiment.
Figure 4:
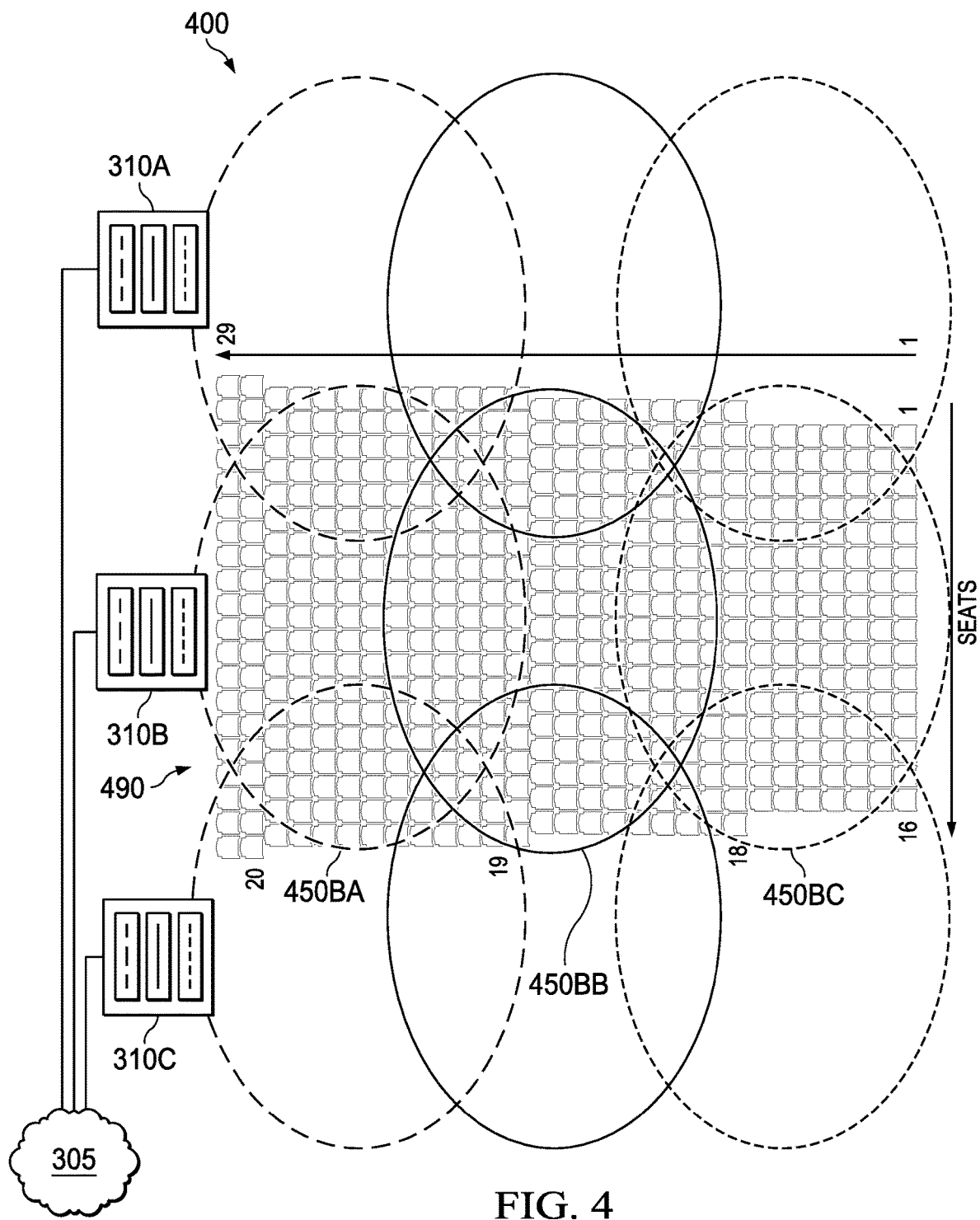
FIG. 4 illustrates the coverage provided by the WiFi network solution shown in FIG. 3, according to an embodiment.

Disclosed herein is an embodiment of a WiFi network solution employing next generation overhead APs integrating multiple WiFi radios coupled with directional antennas with re-configurable coverage, as shown in FIGS. 3 and 4. This solution can meet all of the above requirements for a large public venue at a lower cost and better performance than WiFi network solutions employing handrails and under-seat Aps as explained below.

A. Link Budget

Let us first compare the received signal strength in the downlink for an overhead AP located at 100 feet from the client and an under-seat AP covering only up to 10'. An under-seat AP with 10 feet coverage covers approximately a typical 5-seats radius or 81 seats per AP. Although an additional 20 dB path loss is incurred by an overhead AP to reach front-row users at 100 feet compared to the 10 feet coverage of an under-seat AP, the worst RF signal reaching users from the overhead AP will in fact be 10 dB higher than from an under-seat AP. This is due to overhead APs benefiting from their directional antenna's higher gain while under-seat APs suffer from severe signal attenuation due to human bodies and seating structures to reach a user at the cell edge at 10 feet. Note that the downlink budget advantage for overhead APs will not decrease significantly for distances up to 150 feet.

Turning our attention to the uplink, there is a misconception that because overhead APs are far away from client devices which transmit with lower power compared to APs, the received signal strength from the client device will not only be too weak at the overhead AP but will also be lower than for under-seat AP. In fact, the situation is completely the opposite. Overhead APs enjoy a 13 dB stronger received signal strength for worst-case client devices as compared to under-seat APs. This is because the signal received from client devices benefit from the directional antenna's high gain for an overhead AP compared to the low gain of an under-seat AP with omnidirectional antennas. For example, the signal received from 100 feet with a typical 13 dBi gain antenna is the same as the signal received from 22 feet with an omnidirectional antenna, which is not considered far away from an AP. Furthermore, when the building architecture permits the installation of APs with a direct view of users, directional overhead APs with advanced antennas can even reach up to 300 feet while maintaining the signal level advantages described previously.

The RF downlink and uplink budget discrepancies between the overhead and under-seat/handrail APs become even more in favor of the overhead AP when we consider the fact that approximately 40% percent of the users are in fact at the edge of the under-seat AP coverage area, and are thus in the worst signal coverage conditions. That is, with under-seat APs, 40% of the venue is experiencing the worst conditions. A similar argument can be made about handrail APs where the situation is even worse. Typical sections are 20 to 30 seats wide. Therefore, 50% of the users are at least more than 10 feet (and 5 bodies of signal loss) from an adjacent AP. Obviously, users seated close to an under-seat or handrail APs will enjoy good signals but a significant fraction of users in the venue will have a bad experience.

Figure 6:
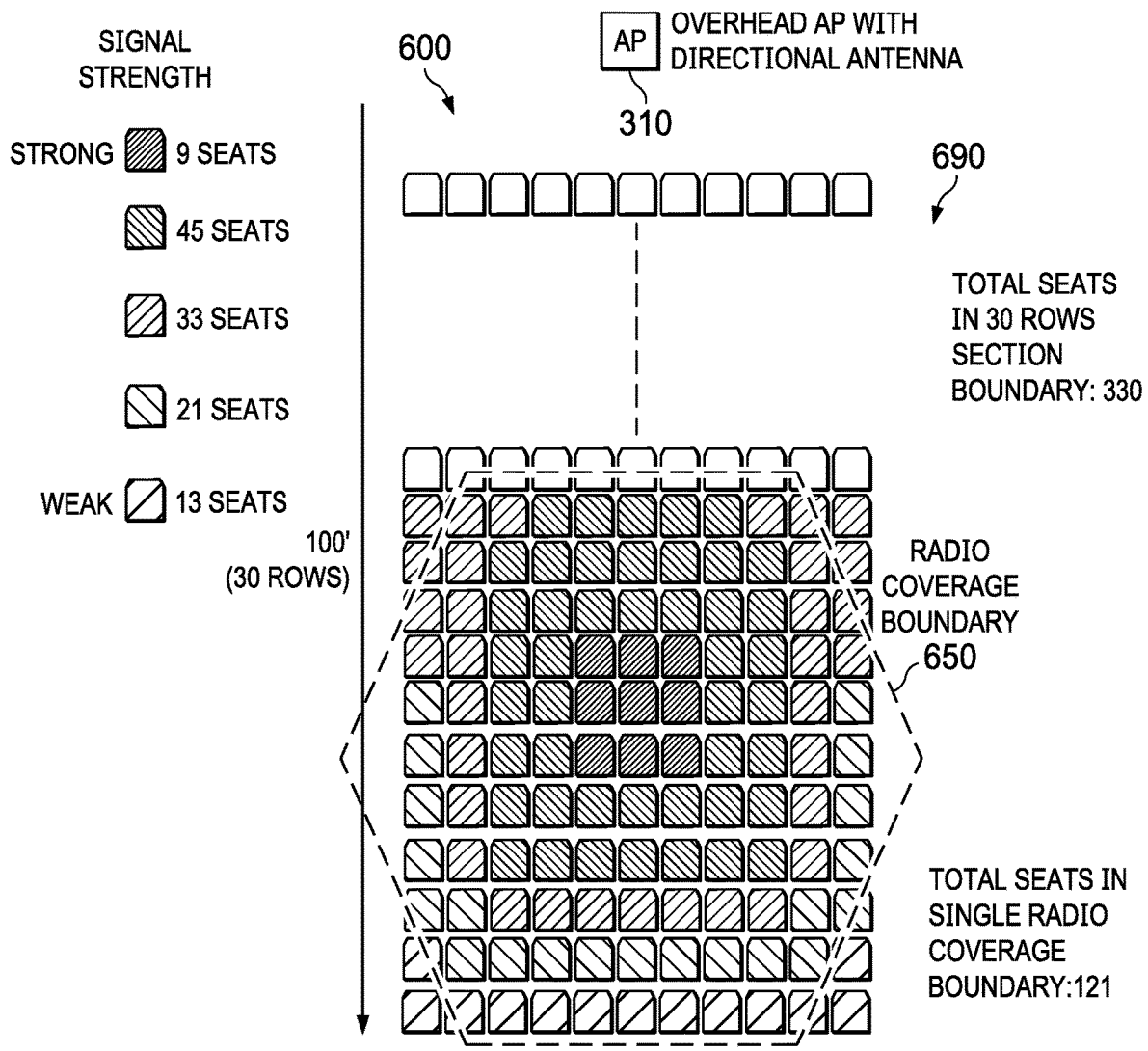
FIG. 6 illustrates the typical front rows coverage for an overhead AP, according to an embodiment.

Meanwhile, for overhead APs very few users in the entire venue will actually be at 100 feet from the AP and be in the worst-case propagation scenario. FIG. 6 illustrates coverage 600 of seating section 690, and specifically the typical front rows coverage by a small zone 650 provided by an overhead AP 310. The illustrated signal strength in the zone 650 is due to the facts that 1) there is a quick antenna gain decrease caused by the high antenna directionality, 2) most users in the main antenna beam are relatively at the same distance from the AP 310 for a given radio, and 3) as we are moving toward AP 310, the distance to AP 310 decreases, and therefore the free space path loss decreases (the radio illuminating angle also becomes steeper and there is thus less human body shadowing as we move toward the AP 310). The upper rows of section 690 are not shown because there is lesser path loss from the AP 310, and thus the signal is good in the remaining rows. In fact, transmit power can actually be reduced for radios covering the mid to upper rows, leading to additional decrease in interference in the entire venue. Therefore, there is only about 10% of the seats ((13+21) seats out of 330 seats) in the venue that are in the worst-case received signal strength locations.

In conclusion, when using in-crowd APs, close to a majority of users is actually experiencing the worst-case signal quality while for overhead APs only a small fraction of users is in the worst-case scenario. Furthermore, the worst signal quality for in-crowd APs is worse than for overhead APs. This results in a double-negative effect for in-crowd APS because many more users are in the worst conditions, and the worst conditions are the poorest. Note that in instances where an overhead AP cannot be mounted with sufficient architectural and human body construction clearance, an overhead AP will enjoy less than the predicted 10 dB and 13 dB advantages.

This conclusion that overhead APs provide better coverage than fill-in APs should not come as a surprise if we examine the early history of fill-in APs discussed previously. It was then observed that most clients would connect to the overhead APs instead of the fill-in APs. This can be easily explained by the fact that only client devices close to the fill-in APs would see a better signal from, and thus associate to, the fill-in APs. All other devices would see a better signal from the overhead APs. This observation clearly supports our conclusion above. Therefore, instead of fixing the problem, solutions based on handrail and under-seat APs extend the inappropriate design to the entire venue.

However, one has to be careful when selecting overhead APs to achieve those link benefits. That is, poorly designed APs and antennas can easily negate the antenna gain benefits. First, the antenna gain must be approximately constant across the entire bandwidth of operation of the APs with less than 3 dB variation. Considering that the AP must operate over almost a 1 GHz band for the 5 GHz WiFi channels, only advanced antenna design techniques can yield the required constant gain across the entire 5 GHz band. Furthermore, to consistently achieve the required performance for all manufactured antennas, rigorous antenna design, manufacturing process and testing must be followed. It is also critical to minimize signal loss in the AP assembly. Therefore, APs employing external antennas will be highly penalized because of the external cable and connector loss. Also, the most advanced materials must be employed in the antenna fabrication to minimize signal loss in the antenna feeding network. Finally, the best RF front-ends must be employed to achieve the required transmit power with high signal integrity and the lowest receiver sensitivity.

Figure 5:
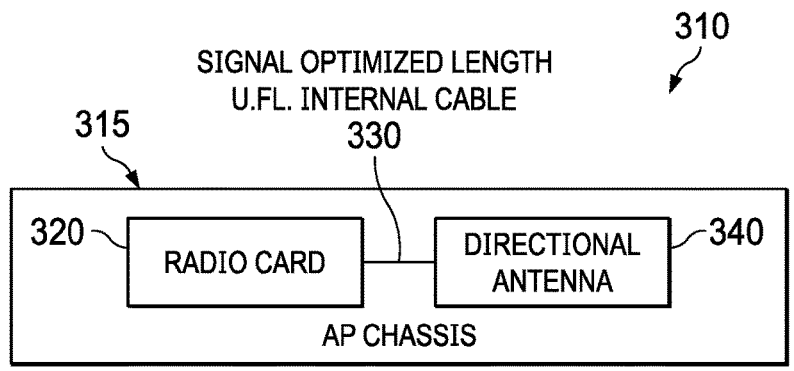
FIG. 5 illustrates a next generation overhead AP with integrated advanced antennas featuring improved antenna gain, according to an embodiment.

In first generation overhead AP, the internal and external cables and connectors required to connect the RF radio cards to the antennas can easily add 5 to 6 dB of signal loss. Inconsistent antenna gain pattern across the entire 5 GHz band and low quality antenna manufacturing processes further degrade the RF signal. FIG. 5 illustrates a next generation overhead AP 310 with integrated advanced antennas 340 featuring improved antenna gain. The next generation overhead AP 310 includes, in addition to the antennas 340, one or more radio cards 320 coupled with the antennas 340 through internal cables 330. These components of the AP 310 are disposed inside a chassis 315. By minimizing cable and connector loss, increasing antenna gain and consistency, and using the latest radio transceivers with improved sensitivity, 6 to 8 dB of power link budget improvement can be achieved. This is particularly important for uplink reception where the signal received from users is weak and any signal degradation between the antennas and the RF transceiver will negate the benefits of employing high gain directional antennas.

Note that the access point 310 (and its components depicted abstractly in FIG. 5) can be implemented as any one of the universally flexible access points 401, 701, 1001, 1101, 1201, 1401, or 1501 (and their respective components) as described in detail in U.S. Pat. No. 10,129,887, or as any one of the MR-MPA antenna systems 3100M or 3200M (and their respective components) as described in PCT application publication WO 2018/226764.

Note that in a multi-radio design, as discussed below, achieving the receiver sensitivity with simultaneous radio operation is a challenging task that can only be achieved using advanced design in accordance with the technologies described herein.

B. MIMO and MU-MIMO Support

Another important aspect of signal quality is whether MIMO and MU-MIMO transmissions can be efficiently achieved. In stadium and arenas, there is very little multipath diversity upon which MIMO and, to a lesser degree, MU-MIMO relies on to provide simultaneous stream transmissions. In such environments, orthogonal polarization transmissions and angular discrimination is exploited to provide MIMO and MU-MIMO links. For over-head AP's equipped with directional antennas, it is possible to employ antennas transmitting and receiving orthogonally polarized signals to efficiently support the transmission of two data streams for MIMO and MU-MIMO. Furthermore, the number of supported data streams can be further increased by implementing advanced multi-beam transmission techniques. Therefore, overhead APs with directional antennas can leverage MIMO and MU-MIMO transmission techniques to provide the best usage of the spectrum.

Note that because of the number of orthogonal polarizations is usually limited to two (some exotic antennas requiring 3D structures with complicated fabrication processes can achieve a $3^{rd}$ orthogonal polarization), antenna systems cannot transmit efficiently more than two spatial streams, unless other techniques, such as multi-beam transmission, are combined with orthogonal polarization transmission. For example, an antenna system with four polarizations can only transmit efficiently two spatial streams because the four polarizations are not orthogonal to each other and are thus dependent.

Since handrail APs also employ directional antennas (albeit with lower directionality and gain than overhead APs), they should also benefit from MIMO and MU-MIMO transmission techniques. However, because of the much larger body loss suffered by signals emanating from handrail APs as compared to overhead APs, those benefits will disappear due to link imbalance between polarization and/or different users. For under-seat APs, the situation gets worse because they usually employ closely-spaced antennas not providing clean polarization and angular discrimination in line of sight environments. That is, under-seat APs employ antenna technology that rely on rich multipath environments to achieve simultaneous data stream transmissions and therefore cannot provide efficient MIMO and MU-MIMO transmission in stadium and arena venues.

C. Interference Management

The second component to consider for SINR evaluation is interference, which is composed of four logical links: AP to AP, AP to client, client to AP, and client to client. Limiting interference enables WiFi radios to more efficiently use and reuse the channels which is critical to sustain today's current traffic usage where the uplink and downlink traffic is almost symmetrical.

For overhead APs, the antenna directionality controls both the interference generated and received by the AP. Fortunately, at 5 GHz it becomes possible to employ advanced techniques and fabrication technologies to design directional antennas with extremely low side lobe levels (SLL) below 15 dB. Nowadays, almost all WiFi client devices support the 5 GHz band. In addition, there is a limited number of 2.4 GHz channels and the signals propagate further at 2.4 GHz (6 dB less path loss). 2.4 GHz channels thus suffer from heavy interference. For those reasons, the 2.4 GHz band is seldom used to deploy WiFi networks in UHD venues. SSL is the antenna gain difference between the maximum gain and the antenna gain outside the main antenna beam. Lower SLL therefore results in lower signal spillage (in downlink)/reception (in uplink) to/from areas outside the intended coverage zone.

Therefore, properly designed directional antennas ensure good quality signal inside the coverage zone and rapidly decreasing and limited interference outside this zone. Therefore, interference generated from an overhead AP to client devices outside the coverage and to other overhead APs is strictly limited. Furthermore, because of the link symmetry between APs and client devices, the interference received by the APs is also strictly controlled by the antenna's directionality and SLL. Most importantly, this interference control is structurally managed by the venue architecture and antenna placement, and therefore is totally independent of non-controllable effects such as the crowd density, positioning and behavior. Thereby, the interference is well managed by directional antennas for the AP to AP, AP to client and client to AP interference links.

It is also interesting to note that interference levels observed at the clients are much higher than the ones observed at the APs. There are multiple factors that explain this observation. First, client devices employ omnidirectional antennas and cannot attenuate unwanted in-coming signals from other APs as effectively as a directional antenna in an overhead AP. Further, the client to client interference link also needs to be considered at the client device. Again, because omnidirectional antennas are employed in client devices, a larger number of interfering signals generated from other client devices is captured by a client device's omnidirectional antenna than by an overhead AP with a directional antenna. This is further compounded by the fact that interfering clients are in-crowd and thus closer to the receiving clients than to an overhead AP, leading to higher interference signal strength from other client devices.

It is important to note that the only approach to limit the damaging client to client interference is to maximize the distance between clients reusing the same or adjacent channels. This is equivalent to saying that WiFi radios providing coverage for the same or adjacent channel should cover zones as far apart as possible, which can only be done by decreasing the radio density. Decreasing the radio density inherently forces the radio's coverage area to expand thus covering more seats and users. However, this conflicts with the capacity requirement. Thus, the best solution is to deploy a density of radios as close as possible to the radio capacity capabilities to provide the lowest level of client to client interference while meeting the capacity demand.

At this stage, we can also conclude that although the uplink signal received at the AP from the client devices may be a few dB's lower than the downlink signal received at the client devices, the downlink and uplink SINR's for an overhead AP are almost symmetrical because of the lower interference level at the APs. This symmetry is not the case for under-seat APs as discussed next.

Under-seat APs (and also handrail APs) employ omnidirectional antennas and are installed in the crowd. They therefore behave from an interference perspective as client devices. That is, all interference links for under-seat AP deployments are similar to the client to client interference link, which in fact, as discussed before, is the worst interfering link for any deployment using directional antennas. It should therefore not be surprising that interference levels are higher in under-seat deployment than for overhead deployments.

Furthermore, WiFi radios installed under-seat and in handrails only rely on crowd attenuation to constrain the interference generated outside the intended coverage zone. This is only an effective mechanism if the crowd is dense. However, crowd density and behavior in general is not well controlled nor predictable which renders, by extension, interference control and management inefficient and sometimes ineffective for under-seat deployments. Furthermore, under-seat AP interference management based on human body attenuation can only be efficient, with the above limitations, in the immediate AP vicinity. That is, there are several cases where across the bowl, in curved end-zones, and between bowl levels, interference generated by an AP to other APs and clients has limited human body attenuation and therefore results in very high interference.

In addition, as discussed previously, client to client interference can mostly be controlled by maximizing the distance between clients reusing the same channels. In under-seat APs the AP coverage is limited to about 50 to 75 seats because of the rapid signal attenuation limiting the reaching distance of the AP. That is, the number of seats covered by an AP is artificially capped below the actual serving capacity of an AP. Since the cell size served by a WiFi radio is smaller for under-seat and handrails APs than overhead AP's, this entails deploying under-seat APs which are closer to each other, rendering the channel reuse distance smaller and thus increasing the client to client interference (and by extension the AP to AP, AP to client and client to AP) interference is higher.

Note that for millimeter wave frequencies (such as for 802.11ad), the free space path loss and body attenuation is significantly higher than for sub 6 GHz frequencies currently employed for WiFi coverage. With millimeter wave technology it would become possible to design a super dense in-crowd Pico cell network where each millimeter wave AP only serves a few line-of-sight client devices with good SINR. However, the number of required millimeter APs would be in the tens of thousands.

D. Capacity Design

As discussed above, to accommodate for the user capacity requirements we need to ensure that each WiFi radio will not be required to serve more than its maximum capacity of 150 clients. As also previously noted, to decrease client to client interference we want to have each WiFi radio serving the maximum number of users possible. We also want to provide some overlap between adjacent cells to enable efficient load balancing avoiding WiFi radios overloading due to sporadic and local demand surge.

Figure 2:
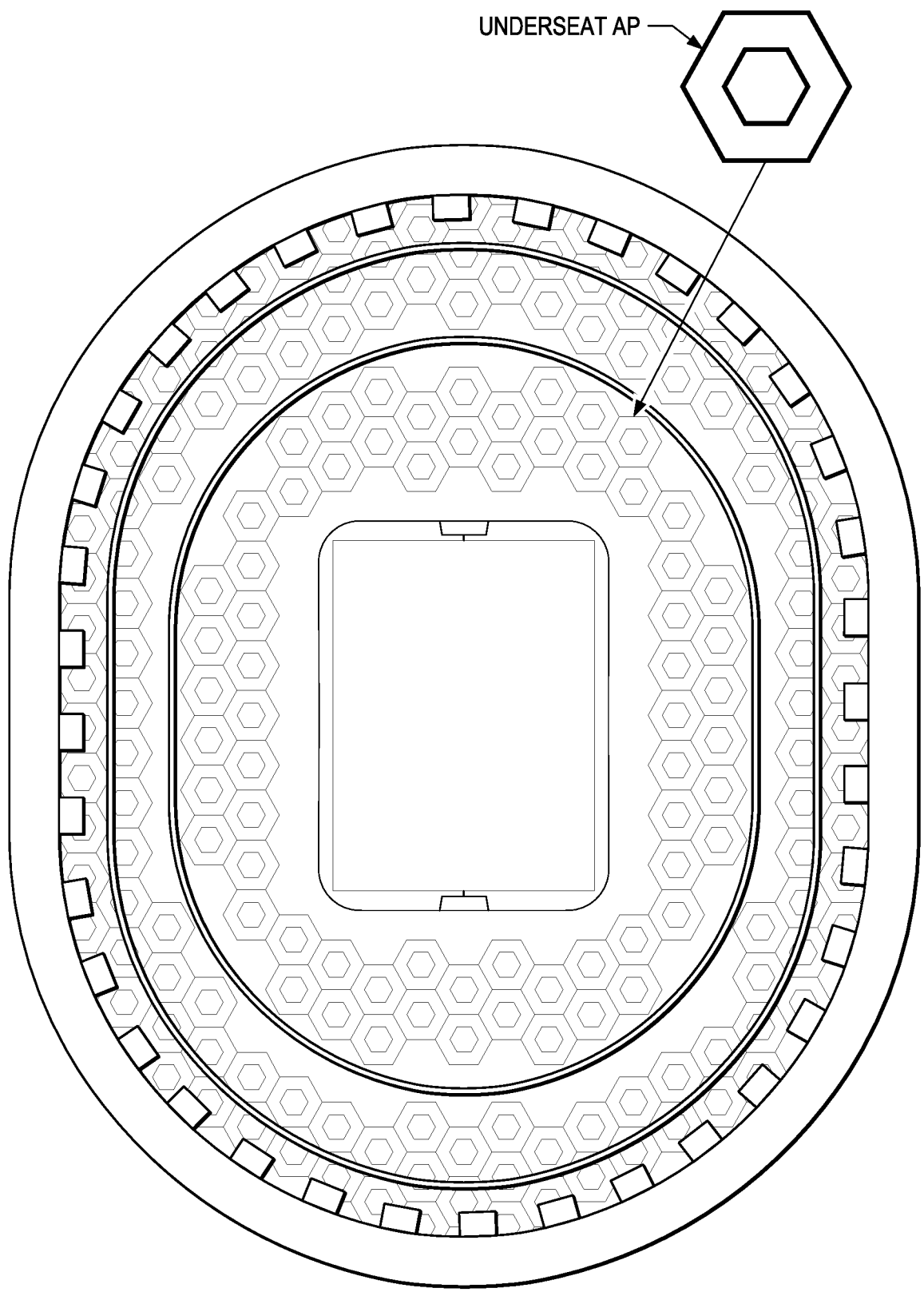
FIG. 2 illustrates the use of under-seat and handrail APs.

For a typical under-seat deployment, e.g., as shown in FIG. 2, under-seat and handrail APs can achieve the first goal of limiting number of served users below 150. However, due to limited coverage caused by body attenuation, each under-seat AP cannot reach the maximum number of users permitted and therefore those networks suffer from increased interference due to the high number of under-seat APs and their proximity. Furthermore, APs with a single radio at 5 GHz (remember that 2.4 GHz are of little use and usually turned off in UHD environments) cannot achieve the third goal. If there is a need to deploy in-crowd APs in restricted areas with a severely obstructed line-of-sight view to available architectural mounting locations, APs with at least two radios simultaneously operating in the 5 GHz band can be used to enable load balancing and accommodate for further increases in traffic demand.

Similar to networks deployed using under-seat and handrail APs, dense high capacity networks can be deployed using overhead APs where each directional overhead AP provides coverage to the optimal number of users. This approach is illustrated in FIGS. 3 and 4. For example, FIG. 3 illustrates a WiFi network 300 employing next generation overhead APs 310 connected to a backhaul network 305 integrating multiple WiFi radios 320A, 320B, 320C coupled with directional antennas with re-configurable coverage. FIG. 4 shows coverage 400 of seating section 490 by next generation overhead APs 310A, 310B, 310C connected to the backhaul network 305. Obviously, deploying a large number of overhead APs 310A, 310B, 310C is not sufficient if the antenna beam width is not properly designed to achieve the correct balance between overlapping coverage areas between radios and channel reuse (e.g., two WiFi radios using the same channel should have coverage zones that are sufficiently spaced to limit the interference and collision domains). Let's consider a 30-degrees beam width antenna. A WiFi radio using such a directional antenna would cover about 50 feet wide at a 100 feet distance, which is approximately the width of a typical seating section. In case mounting locations are not available, a similar result is obtained with a 15 degrees beam width antenna at 250 feet distance. Furthermore, a typical low bowl stadium seating section would have about 650 to 700 seats, therefore requiring coverage from about 5 radios. If we deploy an average of nine radios per two seating sections, we can easily conclude that each radio will serve approximately 150 users. The actual density of overhead APs should be adjusted as a function of the seating sections size.

Given that there are about 20 channels available at 5 Ghz (discounting for a few channels not usable due to neighboring radars), the same channel would be reused every four sections. Properly designed antennas with low SLL can thus reduce interference spill-over allowing for increased frequency reuse. Note that for typical under-seat APs deployment density, the same channel is reused every two sections, further illustrating the fact that under-seat APs exhibit higher client to client interference signal strength.

In summary, and as illustrated in FIG. 4, we can thus conclude that wireless networks using overhead APs 310A, 310B, 310C can achieve the three objectives of providing sufficient capacity, minimizing interference, and provide overlapping coverage for load balancing.

E. Costs and Installation Time

It is well known that under-seat and handrail APs incur additional costs compared to overhead APs (extra costs include concrete core drilling and preparation, environmental penetration risk, more complex conduit and cabling, meaningful enclosure trip hazard, and higher operation and maintenance costs). On the other hand, simply deploying a sufficient number of overhead APs to meet the capacity requirements as discussed previously also has drawbacks. First, the cost would start to go up and second, a sufficient number of mounting locations might not be available. Therefore, to keep installation costs down and deployment times short, the solution is to integrate multiple WiFi radios serving the 5 Ghz band in a single AP. As a side note but relevant to this disclosure, integrating multiple radios within an AP is not as straightforward as it sounds since the AP must be carefully designed to provide sufficient isolation to enable all radios to operate simultaneously. However, this is still not sufficient because if all the radios provide matching broadside directional antennas, it will not be possible to adequately cover from a single AP location an entire seating sections from the first row to the last row with a 30-degree beam width. Nor would it be possible to bring forth MIMO and MU-MIMO capabilities for high quality RF signal, as mentioned earlier. We must therefore have directional antennas with different coverage options. Most preferably to provide for adequate flexibility in the channel plan design, it is best to have some or all radios employing reconfigurable coverage antennas. FIG. 4 illustrates this concept where a three-radio directional AP 310B provides coverage to an entire section by dividing it into three small zones 450BA, 450BB, 450BC, each associated with a radio employing an independently reconfigurable directional antenna. In this example, the first small zone 450BA is provided by the first radio 320A of the three-radio directional AP 310B, the second small zone 450BB is provided by the second radio 320B of the three-radio directional AP 310B, and the third small zone 450BC is provided by the third radio 320C of the three-radio directional AP 310B.

Using multi-radio overhead APs, where the quantity of APs required is only 20-25% compared to an under-seat design, the installation costs are therefore dramatically decreased. Furthermore, the installation time is also significantly shortened versus the deployment of WiFi networks using under-seat and handrail APs. Another advantage is that it can be done with little or no interruptions to normal building operation. Finally, to ensure adequate SINR levels in the entire venue, channel and power planning for the hundreds of radios serving the venue should be performed. With overhead APs, since coverage is mostly determined by the mounting locations, AP installation parameters, and building architecture (body shadowing margin can also be accurately estimated), the prediction models are very accurate and the post-deployment optimization phase is significantly shorter versus deployments using in-crowd APs where the crowd body effects on the 3D RF propagations model are complex to infer and thus much more time is required for post-deployment optimization.

We first saw that with next generation overhead APs both the received signal in the uplink and the downlink are higher than for handrail and under-seat APs. Furthermore, the interference levels are lower for all possible interference links. Therefore, properly installed next generation overhead APs with advanced directional antennas can provide much better SINR on average through the entire venue and particularly to worst-case users, compared to handrail and under-seat APs. This effect is further compounded by the fact that for deployment with under-seat and handrail APs at least 40% of users (versus less than 10% for overhead AP's) are experiencing the worst conditions.

Furthermore, similarly to the network deployed using under-seat and handrail APs, a dense high capacity network can be deployed using next generation overhead APs, where each multi-radio directional overhead AP can provide multiple small coverage zones. As illustrated in FIG. 4, the multi-radio directional overhead APs create multiple overlapping small cells in the seating areas by using the reconfigurable directional beam profiles. Furthermore, as discussed previously, a high capacity network using overhead APs will provide better user experience in the entire venue at a lower Total Cost of Ownership.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems.

Accordingly, other implementations are within the scope of the following claims.

What is claimed is:

1. A wireless network comprising:
  a plurality of access points installed in a venue, the access points integrating multiple radios coupled with directional antennas with reconfigurable coverage, the directional antennas configured to transmit and receive orthogonally polarized signals that support transmission of at least two data streams to or from mobile devices of users who are present in the venue, wherein the access points are configured to enable multiple input, multiple output (MIMO) or multi-user (MU)-MIMO transmissions from a radio from among the multiple radios of an access point by using the orthogonally polarized signals; and
  at least one backhaul or backbone network coupled to the plurality of access points.

2. The wireless network of claim 1, wherein one or more directional antennas of at least one of the access points is configured to provide service to at least one of the mobile devices at a distance of at least 100 feet from the access point.

3. The wireless network of claim 1, wherein each directional antenna provides at least 13 dBi of antenna gain to at least one of the mobile devices at a distance of at least 100 feet from the access point.

4. The wireless network of claim 1, wherein the directional antennas are configured such that the antenna gain of all directional antennas varies less than 3 dB across the entire operating band of the multiple radios.

5. The wireless network of claim 1, wherein the directional antennas and the multiple radios of each access point are integrated inside a respective single chassis.

6. The wireless network of claim 1, wherein the access points are installed above the users, wherein a line of sight between an access point and a given user is unimpeded by permanent venue structures which are closer to the access point than the given user.

7. The wireless network of claim 1, wherein a directional antenna of an access point is configured to transmit multiple beams at different angles to enable MIMO or MU-MIMO transmissions from a radio from among the multiple radios of the access point.

8. The wireless network of claim 1, wherein a directional antenna of an access point is configured to transmit a beam with a width of 30 degrees or less.

9. The wireless network of claim 1, wherein a directional antenna of an access point is configured so that the difference between the maximum antenna gain and the maximum gain outside the main antenna beam is at least 15 dB.

10. The wireless network of claim 1, wherein the directional antennas in an access point are reconfigurable to provide a coverage zone where users connect to a given radio of the multiple radios of the access point in a different direction for each radio.

11. The wireless network of claim 10, wherein coverage zones for different radios in an access point are configured to be partially overlapping.

12. The wireless network of claim 10, wherein coverage zones for different radios in different access points are configured to be partially overlapping.

13. The wireless network of claim 10, wherein different radios in an access point are configured to transmit RF signals with different power.

14. The wireless network of claim 13, wherein a first radio, which provides coverage to a first zone with a shorter distance from the access point than a second zone to which coverage is provided from a second radio in the same access point, is configured to transmit with less power than the second radio.

15. The wireless network of claim 1, wherein an access point is configured to balance load between multiple radios in the access point or in other access points.

16. The wireless network of claim 15, wherein the backhaul network enables users to receive the same wireless service from different access points.

17. The wireless network of claim 1, wherein a radio of the multiple radios of an access point is configured to provide a coverage zone where between 100 and 175 users connect to the radio.

18. The wireless network of claim 1, wherein the directional antennas are reconfigured to provide coverage to at least three zones where users connect to a radio, the coverage to each zone being provided with a different angle.

19. The wireless network of claim 18, wherein the directional antennas in the access point are reconfigured to provide coverage to a single zone with the same angle for two different radios.

20. The wireless network of claim 19, wherein the access points are configured so different coverage zone configurations are applied to two different access points.

* * * * *